US011940701B2

(12) United States Patent
Wu et al.

(10) Patent No.: US 11,940,701 B2
(45) Date of Patent: Mar. 26, 2024

(54) WRITING PANEL AND MANUFACTURING METHOD THEREFOR, AND WRITING BOARD

(71) Applicants: BEIJING BOE OPTOELECTRONICS TECHNOLOGY CO., LTD., Beijing (CN); BOE TECHNOLOGY GROUP CO., LTD., Beijing (CN)

(72) Inventors: Xiaojuan Wu, Beijing (CN); Jiaxing Wang, Beijing (CN); Yang Ge, Beijing (CN); Yu Zhao, Beijing (CN); Jian Wang, Beijing (CN); Hao Yan, Beijing (CN)

(73) Assignees: BEIJING BOE OPTOELECTRONICS TECHNOLOGY CO., LTD., Beijing (CN); BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 17/923,708

(22) PCT Filed: Oct. 12, 2021

(86) PCT No.: PCT/CN2021/123344
§ 371 (c)(1),
(2) Date: Nov. 7, 2022

(87) PCT Pub. No.: WO2022/111092
PCT Pub. Date: Jun. 2, 2022

(65) Prior Publication Data
US 2023/0185143 A1    Jun. 15, 2023

(30) Foreign Application Priority Data
Nov. 25, 2020   (CN) .......................... 202011341890.4

(51) Int. Cl.
*G02F 1/1368* (2006.01)
*G02F 1/1362* (2006.01)
*G02F 1/137* (2006.01)

(52) U.S. Cl.
CPC ...... *G02F 1/1368* (2013.01); *G02F 1/136295* (2021.01); *G02F 1/13718* (2013.01)

(58) Field of Classification Search
CPC ................................................... G02F 1/1368
See application file for complete search history.

(56) References Cited

U.S. PATENT DOCUMENTS

| 5,729,312 | A | | 3/1998 | Yamagishi et al. |
| 6,104,448 | A | * | 8/2000 | Doane ................. C09K 19/586 |
| | | | | 349/169 |

(Continued)

FOREIGN PATENT DOCUMENTS

| CN | 1800916 A | 7/2006 |
| CN | 101029944 A | 9/2007 |

(Continued)

OTHER PUBLICATIONS

PCT International Search Report (w/ English translation) and Written Opinion for corresponding PCT Application No. PCT/CN2021/123344, dated Dec. 23, 2021, 12 pages.

*Primary Examiner* — Sang V Nguyen
(74) *Attorney, Agent, or Firm* — Dority & Manning, P.A.

(57) ABSTRACT

A writing panel includes an array substrate, a flexible substrate disposed opposite to the array substrate, a liquid crystal layer disposed between the array substrate and the flexible substrate, and a plurality of spacers each in a shape of a column disposed on a surface of the array substrate proximate to the liquid crystal layer. The array substrate includes a base and a pixel driving circuit layer disposed on the base, and the pixel driving circuit layer includes a plurality of thin film transistors and a plurality of signal (Continued)

lines. An orthographic projection of each spacer on the base is non-overlapping with orthographic projections of the plurality of thin film transistors and the plurality of signal lines on the base.

18 Claims, 10 Drawing Sheets

(56) References Cited

U.S. PATENT DOCUMENTS

| | | | | |
|---|---|---|---|---|
| 2003/0071958 A1* | 4/2003 | Wu | ................... | G02F 1/133377 349/156 |
| 2008/0024688 A1* | 1/2008 | Mizoguchi | ........ | G02F 1/134363 349/33 |
| 2009/0033811 A1* | 2/2009 | Schneider | ............. | G06F 3/0412 349/12 |
| 2009/0086151 A1* | 4/2009 | Seo | .................... | G02F 1/13394 349/187 |
| 2009/0096942 A1* | 4/2009 | Schneider | ........... | G02F 1/13338 349/12 |
| 2010/0225606 A1 | 9/2010 | Sasaki et al. | | |
| 2012/0099030 A1* | 4/2012 | Pishnyak | ............ | G02F 1/13718 349/1 |
| 2017/0045985 A1* | 2/2017 | Lv | ......................... | G06F 3/0412 |
| 2018/0059847 A1 | 3/2018 | Wang et al. | | |
| 2020/0348560 A1* | 11/2020 | Yi | ....................... | G02F 1/13452 |
| 2021/0311343 A1* | 10/2021 | Song | ................... | G02F 1/13392 |

FOREIGN PATENT DOCUMENTS

| | | | | |
|---|---|---|---|---|
| CN | 101546076 A | | 9/2009 | |
| CN | 107300818 A | | 10/2017 | |
| CN | 109270749 A | | 1/2019 | |
| CN | 109521588 A | | 3/2019 | |
| CN | 110308595 A | | 10/2019 | |
| CN | 111176029 A | | 5/2020 | |
| CN | 210605296 U | | 5/2020 | |
| CN | 213934490 U | | 8/2021 | |
| KR | 2005112388 | * | 11/2005 | ........... G02F 1/1339 |
| KR | 2006019819 | * | 3/2006 | ........... G02F 1/1339 |
| KR | 2006019819 A | * | 3/2006 | ....... G02F 1/133345 |

* cited by examiner

WRITING PANEL AND MANUFACTURING METHOD THEREFOR, AND WRITING BOARD

CROSS-REFERENCE TO RELATED APPLICATIONS

This application is a national phase entry under 35 USC 371 of International Patent Application No. PCT/CN2021/123344 filed on Oct. 12, 2021, which claims priority to Chinese Patent Application No. 202011341890.4, filed on Nov. 25, 2020, which are incorporated herein by reference in their entirety.

TECHNICAL FIELD

The present disclosure relates to the field of display technologies, and in particular, to a writing panel and a manufacturing method therefor, and a writing board.

BACKGROUND

With the development of liquid crystal display technology, liquid crystal writing boards are more and more widely used in education, business applications and other fields.

At present, the liquid crystal writing board mainly utilizes bistable properties of liquid crystal molecules to realize displaying and/or erasing content on the liquid crystal writing board. In order to improve user experience, there is a need to improve uniformity of a stroke width of handwriting on the liquid crystal writing board.

SUMMARY

In an aspect, a writing panel is provided. The writing panel includes an array substrate, a flexible substrate disposed opposite to the array substrate, a liquid crystal layer disposed between the array substrate and the flexible substrate, and a plurality of spacers each in a shape of a column disposed on a surface of the array substrate proximate to the liquid crystal layer.

The array substrate includes a base and a pixel driving circuit layer disposed on the base, and the pixel driving circuit layer includes a plurality of thin film transistors and a plurality of signal lines. An orthographic projection of each spacer on the base is non-overlapping with orthographic projections of the plurality of thin film transistors and the plurality of signal lines on the base.

In some embodiments, the writing panel has a plurality of pixel regions, each pixel region is provided with some of the plurality of spacers therein, and the some of the plurality of spacers are arranged in an array. A row direction of the array in which the some of the plurality of spacers are arranged is a first direction, and a column direction of the array in which the plurality of spacers are arranged is a second direction. In a pixel region of the plurality of pixel regions, a distance between two spacers adjacent to each other in the first direction is approximately equal to a distance between two spacers adjacent to each other in the second direction.

In some embodiments, the writing panel has a plurality of pixel regions, each pixel region is provided with some of the plurality of spacers therein, and the some of the plurality of the spacers are arranged in an array. A row direction of the array in which the some of the plurality of spacers are arranged is a first direction, and a column direction of the array in which the some of the plurality of spacers are arranged is a second direction. A distance between two nearest spacers that are respectively located in two pixel regions adjacent to each other in the first direction is approximately equal to a distance between two nearest spacers that are respectively located in two pixel regions adjacent to each other in the second direction.

In some embodiments, the writing panel has a plurality of pixel regions, each pixel region is provided with some of the plurality of spacers therein, and the some of the plurality of the spacers are arranged in an array. A row direction of the array in which the some of the plurality of spacers are arranged is a first direction, and a column direction of the array in which the some of the plurality of spacers are arranged is a second direction. A distance between two spacers adjacent to each other in the first direction is approximately equal to a distance between two spacers adjacent to each other in the second direction.

In some embodiments, the array substrate further includes an alignment film disposed on a side of the pixel driving circuit layer proximate to the liquid crystal layer. The alignment film is configured to provide liquid crystal molecules in the liquid crystal layer with a pretilt angle.

In some embodiments, the array substrate further includes a first electrode layer disposed on a side of the pixel driving circuit layer proximate to the liquid crystal layer. The flexible substrate includes a flexible base and a second electrode layer disposed on a side of the flexible base proximate to the liquid crystal layer.

In some embodiments, the array substrate includes further an alignment film configured to provide liquid crystal molecules in the liquid crystal layer with a pretilt angle, and the alignment film is disposed on a side of the first electrode layer proximate to the liquid crystal layer.

In some embodiments, the alignment film is in direct contact with the first electrode layer.

In some embodiments, the array substrate further includes a first passivation layer disposed on a side of the first electrode layer proximate to the liquid crystal layer.

In some embodiments, the array substrate includes further an alignment film configured to provide liquid crystal molecules in the liquid crystal layer with a pretilt angle, and the alignment film is disposed on a side of the first passivation layer proximate to the liquid crystal layer.

In some embodiments, in a direction perpendicular to the base, a height of the spacers is in a range of 1.0 µm to 10 µm, inclusive.

In some embodiments, the spacers each have a shape of a circular column, and a diameter of an orthographic projection of one end of the spacer proximate to the array substrate on the base is in a range of 3 µm to 25 µm, inclusive.

In some embodiments, in a plane parallel to the base, a number of spacers provided in a region per square millimeter is in a range of 10 to 1000, inclusive.

In some embodiments, ends of the spacers proximate to the base are fixedly connected to the surface of the array substrate.

In some embodiments, a material of the liquid crystal layer includes cholesteric liquid crystals.

In some embodiments, hardness of the array substrate is greater than hardness of the flexible substrate.

In another aspect, a writing board is provided. The writing board includes the writing panel as described in any of the above embodiments, and a base layer disposed on a side of the array substrate away from the flexible substrate. The base layer is configured to block light from entering the writing panel from the side of the array substrate away from the flexible substrate.

In yet another aspect, a manufacturing method for a writing panel is provided. The manufacturing method includes: forming an array substrate, the array substrate including a base and a pixel driving circuit layer disposed on the base, the pixel driving circuit layer including a plurality of thin film transistors and a plurality of signal lines; forming a plurality of spacers each in a shape of a column on a side of the pixel driving circuit layer away from the base, an orthographic projection of each spacer on the base being non-overlapping with orthographic projections of the plurality of thin film transistors and the plurality of signal lines on the base; forming a liquid crystal layer on the side of the pixel driving circuit layer away from the base; and assembling the array substrate with a flexible substrate.

In some embodiments, forming the array substrate includes: forming a first electrode layer on the side of the pixel driving circuit layer away from the base before the plurality of spacers each in the shape of the column are formed on the side of the pixel driving circuit layer away from the base.

In some embodiments, forming the array substrate further includes: forming an alignment film on a side of the first electrode layer away from the base after the plurality of spacers each in the shape of the column are formed on the side of the pixel driving circuit layer away from the base. The alignment film is in direct contact with the first electrode layer. The alignment film is configured to provide liquid crystal molecules in the liquid crystal layer with a pretilt angle.

In some embodiments, forming the array substrate further includes: forming a first passivation layer on a side of the first electrode layer away from the base before the plurality of spacers each in the shape of the column are formed on the side of the pixel driving circuit layer away from the base.

In some embodiments, forming the array substrate further includes: forming a first passivation layer on a side of the first electrode layer away from the base before the plurality of spacers each in the shape of the column are formed on the side of the pixel driving circuit layer away from the base; and forming an alignment film on a side of the first passivation layer away from the base after the plurality of spacers each in the shape of the column are formed on the side of the pixel driving circuit layer away from the base. The alignment film is configured to provide liquid crystal molecules in the liquid crystal layer with a pretilt angle.

BRIEF DESCRIPTION OF THE DRAWINGS

In order to describe technical solutions in the present disclosure more clearly, accompanying drawings to be used in some embodiments of the present disclosure will be introduced briefly below. Obviously, the accompanying drawings to be described below are merely accompanying drawings of some embodiments of the present disclosure, and a person of ordinary skill in the art may obtain other drawings according to these drawings. In addition, the accompanying drawings to be described below may be regarded as schematic diagrams, and are not limitations on an actual size of a product, an actual process of a method and actual timings of signals to which the embodiments of the present disclosure relate.

DETAILED DESCRIPTION

Figure 1:
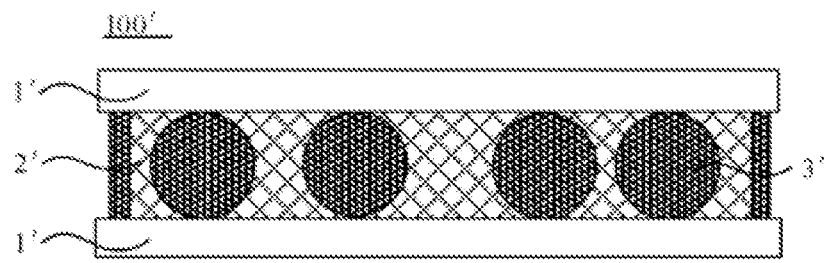
FIG. 1 is a sectional view of a writing board in the related art.

Technical solutions in some embodiments of the present disclosure will be described clearly and completely with reference to the accompanying drawings below. Obviously, the described embodiments are merely some but not all embodiments of the present disclosure. All other embodiments obtained by a person of ordinary skill in the art based on the embodiments of the present disclosure shall be included in the protection scope of the present disclosure.

Unless the context requires otherwise, the term "comprise" and other forms thereof such as the third-person singular form "comprises" and the present participle form "comprising" throughout the specification and the claims are construed as an open and inclusive meaning, i.e., "including, but not limited to". In the description of the specification, the terms such as "one embodiment", "some embodiments", "exemplary embodiments", "example", "specific example" or "some examples" are intended to indicate that specific features, structures, materials or characteristics related to the embodiment(s) or example(s) are included in at least one embodiment or example of the present disclosure. Schematic representation of the above terms do not necessarily refer to the same embodiment(s) or example(s). In addition, the specific features, structures, materials or characteristics may be included in any one or more embodiments or examples in any suitable manner.

Hereinafter, the terms "first" and "second" are used for descriptive purposes only, and are not to be construed as indicating or implying the relative importance or implicitly indicating the number of indicated technical features. Thus, a feature defined with "first" or "second" may explicitly or implicitly include one or more features. In the description of the embodiments of the present disclosure, the term "a plurality of/the plurality of" means two or more unless otherwise specified.

In the description of some embodiments, the terms "connected" and "electrically connected" and their derivatives may be used. For example, the term "connected" may be used in the description of some embodiments to indicate that two or more components are in direct physical or electrical contact with each other. The embodiments disclosed herein are not necessarily limited to the contents herein.

The phrase "A and/or B" includes the following three combinations: only A, only B, and a combination of A and B.

The use of the phrase "configured to" herein means an open and inclusive expression, which does not exclude devices that are configured to perform additional tasks or steps.

In addition, the use of the phrase "based on" is meant to be open and inclusive, since a process, step, calculation or other action that is "based on" one or more of the stated conditions or values may, in practice, be based on additional conditions or values beyond those stated.

As used herein, the term such as "substantially" includes a stated value and an average value within an acceptable range of deviation of a particular value. The acceptable range of deviation is determined by a person of ordinary skill in the art in view of measurement in question and errors associated with measurement of a particular quantity (i.e., limitations of a measurement system).

Exemplary embodiments are described herein with reference to sectional views and/or plan views as idealized exemplary accompanying drawings. In the accompanying drawings, thicknesses of layers and areas of regions are enlarged for clarity. Therefore, variations in shapes with respect to the accompanying drawings due to, for example, manufacturing technologies and/or tolerances may be envisaged. Therefore, the exemplary embodiments should not be construed as being limited to the shapes of the regions shown herein, but including deviations due to, for example, manufacturing. For example, an etched region shown to have a rectangular shape generally has a feature of being curved. Therefore, the regions shown in the accompanying drawings are schematic in nature, and their shapes are not intended to show actual shapes of regions in a device, and are not intended to limit the scope of the exemplary embodiments.

In the related art, as shown in FIG. 1, a writing board 100' includes two flexible substrates 1', and a liquid crystal layer 2' disposed between the two flexible substrates 1'. When pressure generated by writing with a writing pen, a pencil or the like acts on the liquid crystal layer 2' in the writing board 100', texture of liquid crystal molecules in the liquid crystal layer 2' is changed. As a result, the liquid crystal molecules are converted from a state of weakly scattering natural light to a state of selectively reflecting visible light, thereby displaying handwriting on the writing board 100'.

However, limited by an arrangement and material properties of the two flexible substrates 1', only plastic balls or glass balls may serve as spacers 3' to control a cell thickness of the writing board 100'. Moreover, limited by precision of an equipment and a manufacturing process, there are deviations in diameters of the plastic balls or the glass balls, and a distribution density of the plastic balls or the glass balls in the writing board 100' cannot be precisely controlled. Since the plastic balls or the glass balls are unevenly distributed in the writing board 100', forces of the plastic balls or the glass balls in different regions supporting the writing board 100' are different. Therefore, ranges of the liquid crystal layer 2' affected by the pressure acting on different regions of the writing board 100' are different, resulting in less uniformity of strokes of the handwriting displayed on the writing board 100'.

Figure 2:
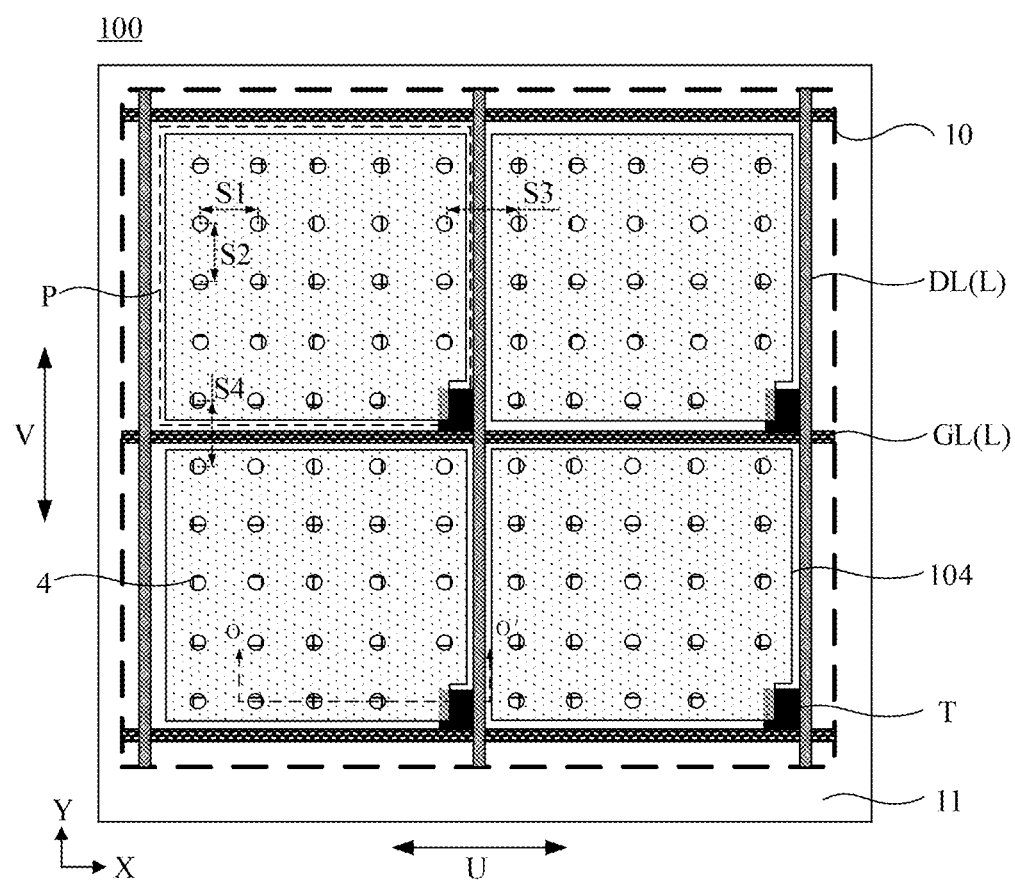
FIG. 2 is a top view of a writing panel, in accordance with some embodiments.

In order to solve the above problems, some embodiments of the present disclosure provide a writing panel. As shown in FIG. 2, the writing panel 100 has a writing region 10. In some embodiments, the writing panel 100 further has a peripheral region 11 located on at least one side of the writing region 10. The writing region 10 has a plurality of pixel regions P, and each pixel region P is provided with a sub-pixel therein.

For the convenience of description, a description is made by taking an example in which the plurality of pixel regions P are arranged in a matrix in some embodiments of the present disclosure. In this case, sub-pixels arranged in a line in a row direction X of the plurality of pixel regions P are referred to as a row of sub-pixels; sub-pixels arranged in a line in a column direction Y of the plurality of pixel regions P are referred to as a column of sub-pixels.

The writing region 10 is further provided therein with a plurality of gate lines GL extending in the row direction X of the plurality of pixel regions P, and a plurality of data lines DL extending in the column direction Y of the plurality of pixel regions P. A single row of sub-pixels may be connected to a single gate line GL, and a single column of sub-pixels may be connected to a single data line DL.

Figure 3:
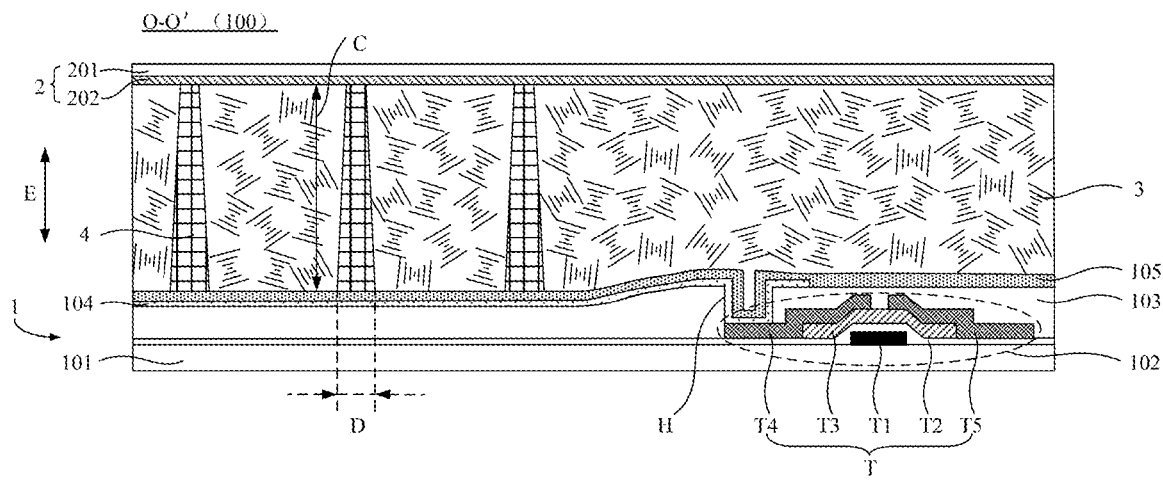
FIG. 3 is a partial sectional view of the writing panel in FIG. 2 taken along the line O-O'.

As shown in FIG. 3, the writing panel 100 includes an array substrate 1 and a flexible substrate 2 disposed opposite to the array substrate 1.

The array substrate 1 includes a base 101 and a pixel driving circuit layer 102 disposed on the base 101.

The pixel driving circuit layer 102 includes a plurality of thin film transistors T and a plurality of signal lines L. Each thin film transistor T includes a gate T1, a portion of a gate insulating layer T2, an active layer T3, a source T4 and a drain T5, and the source T4 and the drain T5 are in contact with the active layer T3.

The plurality of signal lines L at least include the plurality of gate lines GL and the plurality of data lines DL. Each gate line GL is electrically connected to the gate T1 of the thin film transistor T to transmit a gate voltage signal to the gate T1. Each data line DL is electrically connected to one of the source T4 and the drain T5 of the thin film transistor T to transmit a data voltage signal to the one of the source T4 and the drain T5. FIG. 2 shows a case where the data line DL is electrically connected to the drain T5 of the thin film transistor T.

As shown in FIG. 3, the writing panel 100 further includes a liquid crystal layer 3 disposed between the array substrate 1 and the flexible substrate 2.

As shown in FIG. 3, the writing panel 100 further includes a plurality of spacers 4 each in a shape of a column disposed on a surface of the array substrate 1 proximate to the liquid crystal layer 3, and an orthographic projection of each spacer 4 on the base 101 is non-overlapping with orthographic projections of the plurality of thin film transistors T and the plurality of signal lines L on the base 101.

In the embodiments of the present disclosure, the writing panel 100 includes the array substrate 1 and the flexible substrate 2 that are disposed opposite to each other, and the liquid crystal layer 3 is disposed between the array substrate 1 and the flexible substrate 2. In the writing panel 100 of the present disclosure, the plurality of spacers 4 each in a shape of a column are disposed on the surface of the array substrate 1 proximate to the liquid crystal layer 3, and the spacers 4 each have the columnar shape. In this way, it is conducive to control precision of sizes of the spacers 4 and the distribution density of the spacers 4 in the writing panel 100, so as to improve uniformity of a cell thickness of the writing panel 100 and uniformity of the distribution of the spacers 4 in the writing panel 100. As a result, ranges of the liquid crystal layer 3 affected by the pressure acting on different regions of the writing panel 100 are the same or approximately the same, which may improve uniformity of strokes of the handwriting.

Moreover, the orthographic projection of each spacer 4 on the base 101 is non-overlapping with the orthographic projections of the plurality of thin film transistors T and the plurality of signal lines L on the base 101. That is, the spacer 4 is staggered with the thin film transistors T and the signal lines L on the array substrate 1, so that a film layer under the spacers 4 is flat and has a same thickness. In a case where heights of the plurality of spacers 4 (i.e., dimensions of the spacers 4 in a direction E perpendicular to the base 101) are the same, it is conducive to improve the uniformity of the cell thickness of the writing panel 100, and further improve the uniformity of the strokes of the handwriting.

In some embodiments, hardness of the array substrate 1 is greater than hardness of the flexible substrate 2 to ensure structural strength of the writing panel 100, and the plurality of spacers 4 each in the shape of the column are disposed on the array substrate 1 to ensure stable support of the array substrate 1 to the spacers 4.

In some embodiments, as shown in FIG. 3, one end of the spacer 4 proximate to the base 101 is fixedly connected to the surface of the array substrate 1, which may improve the stability of the spacer 4 on the array substrate 1.

In order to improve the uniformity of the distribution of the spacers 4 in the writing panel 100, some embodiments of the present disclosure further provide the following distribution manners of the spacers 4.

In some embodiments, as shown in FIG. 2, each pixel region P is provided with spacers 4 therein, and the spacers 4 are arranged in an array. A row direction of the array in which the spacers 4 are arranged is a first direction U, and a column direction of the array in which the spacers 4 are arranged is a second direction V.

For example, as shown in FIG. 2, the first direction U is parallel to the row direction X of the plurality of pixel regions P, and the second direction V is parallel to the column direction Y of the plurality of pixel regions P.

In a single pixel region P, a distance S1 between two spacers 4 adjacent to each other in the first direction U is equal to or approximately equal to a distance S2 between two spacers 4 adjacent to each other in the second direction V.

It will be noted that "distance between two spacers 4" may be a vertical distance between central axes of the two spacers 4.

Through the above arrangement of the spacers 4, uniformity of the distribution of the spacers 4 in each pixel region P may be improved.

In some embodiments, as shown in FIG. 2, a distance S3 between two nearest spacers 4 in two pixel regions P adjacent to each other in the first direction U is equal to or approximately equal to a distance S4 between two nearest spacers 4 in two pixel regions P adjacent to each other in the second direction V.

Through the above arrangement of the spacers 4, in a region where the two adjacent pixel regions P are close to each other, uniformity of the distribution of spacers 4 in the region may be improved.

In some embodiments, as shown in FIG. 2, a distance between two spacers 4 adjacent to each other in the first direction U is equal to or approximately equal to a distance between two spacers 4 adjacent to each other in the second direction V.

It will be noted that "the distance between the two spacers 4 adjacent to each other in the first direction U" refers to, regardless of division of the pixel regions P, a distance between any two spacers 4 adjacent to each other in the first direction U. For example, "the distance between the two spacers 4 adjacent to each other in the first direction U" may refer to the distance S1 or the distance S3.

Similarly, "the distance between the two spacers 4 adjacent to each other in the second direction V" refers to, regardless of division of the pixel regions P, a distance between any two spacers 4 adjacent to each other in the second direction V. For example, "the distance between the two spacers 4 adjacent to each other in the second direction V" may refer to the distance S2 or the distance S4.

Through the above arrangement of the spacers 4, uniformity of the distribution of the spacers 4 in each region of the writing panel 100 may be improved.

In some embodiments, as shown in FIG. 3, the array substrate 1 further includes a first electrode layer 104 disposed on a side of the pixel driving circuit layer 102 proximate to the liquid crystal layer 3.

The flexible substrate 2 includes a flexible base 201 and a second electrode layer 202 disposed on a side of the flexible base 201 proximate to the liquid crystal layer 3. The flexible substrate 2 is used to withstand the pressure of the writing, and the pressure directly acts on the flexible base 201 of the flexible substrate 2 during writing.

As mentioned above, when the pressure generated by writing with the writing pen, the pencil or the like acts on the liquid crystal layer 3 in the writing panel 100, the texture of liquid crystal molecules in the liquid crystal layer 3 is changed. The liquid crystal molecules are converted from the state of weakly scattering the natural light to the state of selectively reflecting the visible light, thereby displaying the handwriting on the writing panel 100. Voltages are respectively applied to the first electrode layer 104 and the second electrode layer 202 during erasing the handwriting, and an electric field is generated between the first electrode layer 104 and the second electrode layer 202. The liquid crystal molecules in the liquid crystal layer 3 rotate due to action of electric field force to restore original texture thereof. That is, the liquid crystal molecules are restored from the state of selectively reflecting the visible light to the state of weakly scattering the natural light, thereby erasing the handwriting on the writing panel 100. Therefore, a voltage difference between the voltages applied to the first electrode layer 104 and the second electrode layer 202 may be referred to as an "erasing voltage".

For example, as shown in FIGS. 2 and 3, the first electrode layer 104 includes a plurality block electrodes separated from each other. The second electrode layer 202 is a whole layer of electrode extending the entire writing region 10 on the flexible base 201.

For example, a material of the first electrode layer 104 and/or the second electrode layer 202 may include a transparent metal oxide conductive material such as indium tin oxide (ITO).

For example, a material of the flexible base 201 includes polyethylene terephthalate (PET).

In some embodiments, a material of the liquid crystal layer 3 includes cholesteric liquid crystals. As can be seen from the foregoing description, the pressure acts on the liquid crystal layer 3 in the writing panel 100, and the texture of the liquid crystal molecules in the liquid crystal layer 3 is changed. The liquid crystal molecules are converted from the state of weakly scattering the natural light to the state of selectively reflecting the visible light. In a case where cholesteric liquid crystal molecules are in the state of weakly scattering the natural light, the texture of the cholesteric liquid crystal molecules is focal conic texture. In a case where the cholesteric liquid crystal molecules are in the state of selectively reflecting the visible light, the texture of the cholesteric liquid crystal molecules is planar texture.

Figure 4:
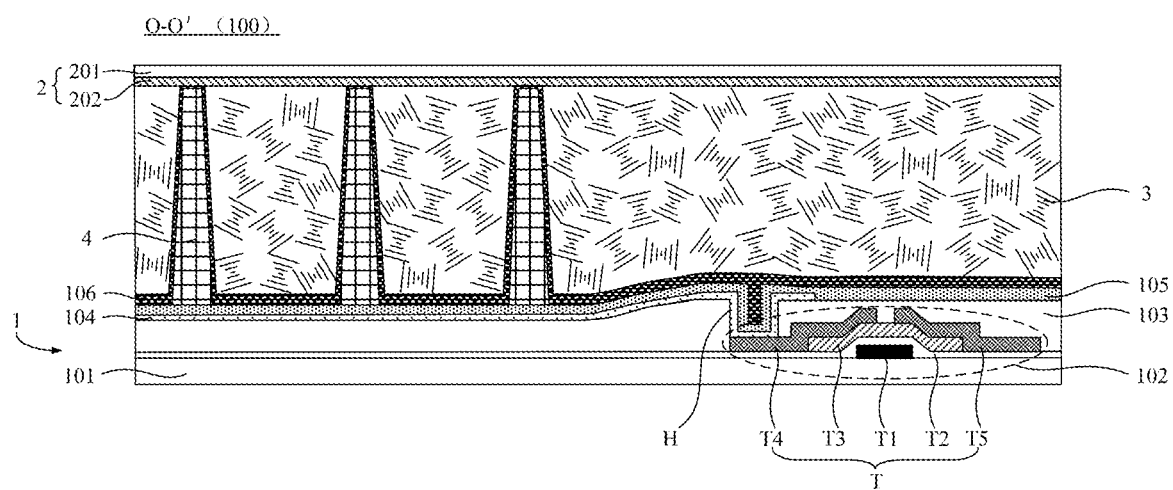
FIG. 4 is a partial sectional view of another writing panel with reference to the line O-O' in FIG. 2, in accordance with some embodiments.
Figure 5:
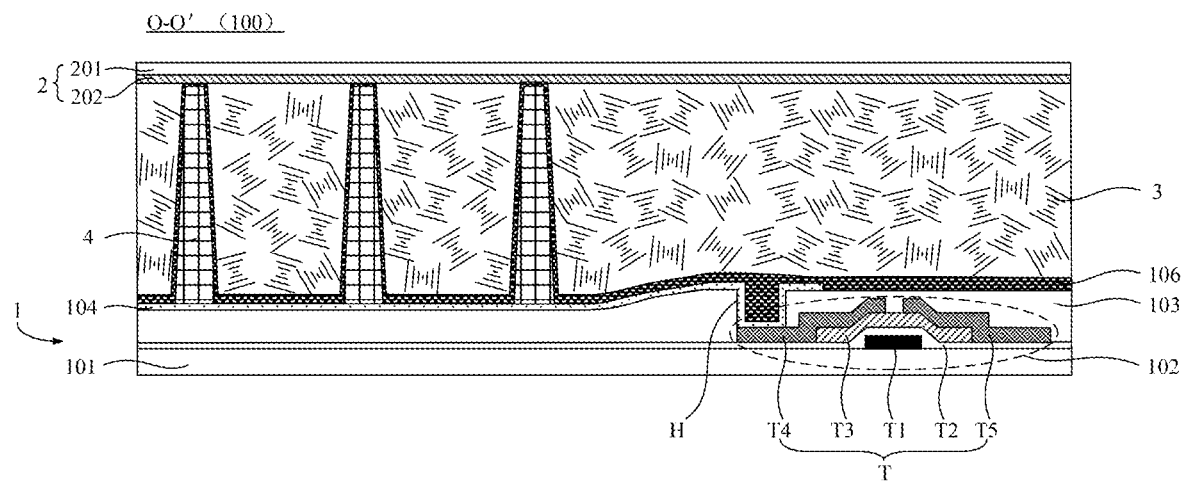
FIG. 5 is a partial sectional view of yet another writing panel with reference to the line O-O' in FIG. 2, in accordance with some embodiments.

In some embodiments, as shown in FIGS. 4 and 5, the array substrate 1 further includes an alignment film 106 disposed on the side of the pixel driving circuit layer 102 proximate to the liquid crystal layer 3. The alignment film 106 is configured to provide the liquid crystal molecules in the liquid crystal layer 3 with a pretilt angle, so that the liquid crystal molecules are arranged regularly. In this way, during erasing the handwriting, most liquid crystal molecules in the liquid crystal layer 3 are easy to rotate, and are restored to the original texture due to the action of the electric field force. Therefore, the handwriting may be erased by appropriately reducing a magnitude of the erasing voltage, which may reduce power consumption of the writing panel 100. Moreover, in a case where the magnitude of the erasing voltage is unchanged, since the liquid crystal molecules in the liquid crystal layer 3 have the pretilt angle, most of the liquid crystal molecules in the liquid crystal layer 3 are quickly restored to the original texture due to the action of the electric field force during erasing the handwriting. Therefore, a response speed of erasing the handwriting may be improved.

In some embodiments, as shown in FIGS. 4 and 5, the alignment film 106 is disposed a side of the first electrode layer 104 proximate to the liquid crystal layer 3.

For example, as shown in FIG. 5, the alignment film 106 is in direct contact with the first electrode layer 104. The alignment film 106 not only provides the liquid crystal molecules in the liquid crystal layer 3 with the pretilt angle, but also protects the first electrode layer 104. Moreover, the alignment film 106 insulates the first electrode layer 104 from the second electrode layer 202, so as to avoid a short circuit caused by electrical connection between the first electrode layer 104 and the second electrode layer 202 due to deformation of the writing panel 100 under pressure.

In some embodiments, as shown in FIG. 3, the array substrate 1 further includes a first passivation layer 105 disposed on the side of the first electrode layer 104 proximate to the liquid crystal layer 3. The first passivation layer 105 protects the first electrode layer 104, and insulates the first electrode layer 104 from the second electrode layer 202, so as to avoid the short circuit caused by the electrical connection between the first electrode layer 104 and the second electrode layer 202 due to the deformation of the writing panel 100 under the pressure.

In some other embodiments, as shown in FIG. 4, in a case where the array substrate 1 further includes the alignment film 106, the first passivation layer 105 is disposed on the side of the first electrode layer 104 proximate to the liquid crystal layer 3, and the alignment film 106 is disposed on a side of the first passivation layer 105 proximate to the liquid crystal layer 3.

In addition, in order to realize control of a stroke width of the handwriting on the writing panel 100, the following simulation experiments are conducted in some embodiments of the present disclosure.

Figure 6:
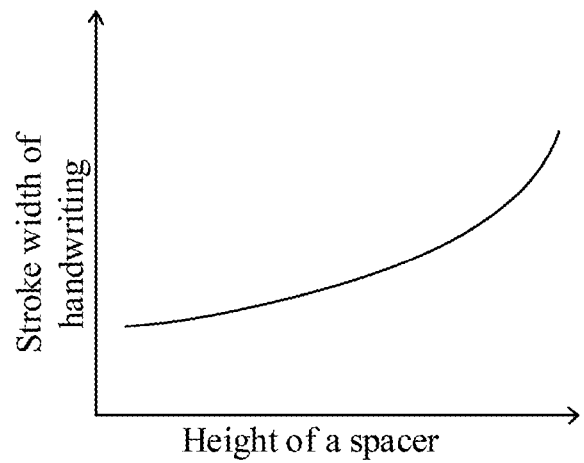
FIG. 6 is a curve chart showing a relationship between a stroke width of handwriting on a writing panel and a height of a spacer, in accordance with some embodiments.

In some embodiments, in a case where different heights of the spacer 4 (i.e., the dimension of the spacer 4 in the direction E perpendicular to the base 101) are simulated, the stroke width of the handwriting on the writing panel 100 is measured. FIG. 6 is a curve chart showing a relationship between the stroke width of the handwriting and the height of the spacer 4. As can be seen, as the height of the spacer 4 increases, a thickness of the liquid crystal layer 3 increases. In this way, when the pressure acts on the liquid crystal layer 3, liquid crystal molecules with the texture change are more likely to flow to a peripheral of a region where the pressure occurs, thereby expanding the region of the liquid crystal molecules with the texture change. As a result, the stroke width of the handwriting increases. Similarly, as the height of the spacer 4 decreases, the stroke width of the handwriting decreases.

For example, as shown in FIG. 3, in the direction E perpendicular to the base 101, the height C of the spacer 4 is in a range of 1.0 µm to 10 µm, inclusive. For example, the height C may be 1.0 µm, 4.0 µm, 5.5 µm, 8.0 µm or 10 µm.

For example, as shown in FIG. 3, in the direction E perpendicular to the base 101, the height C of the spacer 4 is in a range of 1.5 µm to 5 µm, inclusive. For example, the height C may be 1.5 µm, 2.0 µm, 3.25 µm, 4.0 µm or 5 µm.

Further, as shown in FIG. 3, in the direction E perpendicular to the base 101, the height C of the spacer 4 is in a range of 1.9 µm to 2.5 µm, inclusive. For example, the height C may be 1.9 µm, 2.0 µm, 2.2 µm, 2.3 µm or 2.5 µm.

When the writing is performed on the writing panel 100, the writing pressure will at least act on the liquid crystal layer 3 and the spacers 4. That is, both the liquid crystal layer 3 and the spacer 4 can withstand portion of the writing pressure.

Figure 7:
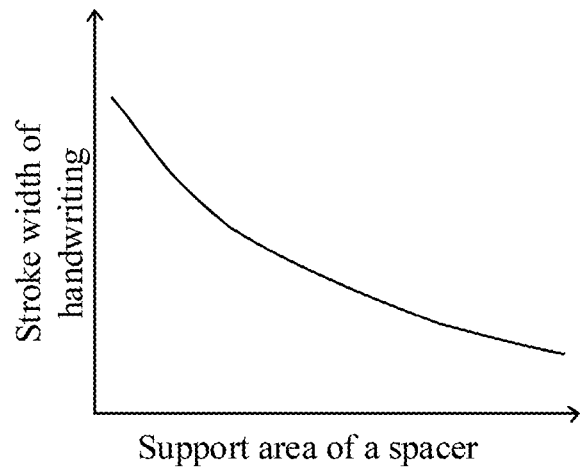
FIG. 7 is a curve chart showing a relationship between a stroke width of handwriting on a writing panel and a support area of a spacer, in accordance with some embodiments.

In light of this, in some embodiments, in a case where different support areas of the spacer 4 are simulated, the stroke width of the handwriting on the writing panel 100 is measured. FIG. 7 is a curve chart showing a relationship between the stroke width of the handwriting and the support area of the spacer 4. As can be seen, as the support area of the spacer 4 increases, the stroke width of the handwriting decreases. This is because as the support area of the spacer 4 increases, the pressure on the spacer 4 increases, and the pressure on the liquid crystal layer 3 decreases. That is, when the same magnitude of pressure acts on the writing panel 100, a proportion of the pressure on the liquid crystal layer 3 (i.e., a ratio of the pressure on the liquid crystal layer 3 to the total pressure acting on the writing panel 100) decreases. Therefore, the region of liquid crystal molecules with the texture change decreases, and the stroke width of the handwriting decreases. Similarly, as the support area of the spacer 4 decreases, the stroke width of the handwriting increases.

It will be noted that, as shown in FIG. 3, an area of an orthographic projection of one end of the spacer 4 proximate to the array substrate 1 on the base 101 is "the support area of the spacer 4".

For example, as shown in FIGS. 2 and 3, the spacer 4 has a cylindrical shape, and a diameter D of the orthographic projection of the end of the spacer 4 proximate to the array substrate 1 on the base 101 is in a range of 3 µm to 25 µm, inclusive. For example, the diameter D may be 3 µm, 10 µm, 14 µm, 20 µm or 25 µm. That is, the support area of the spacer 4 is in a range of 7.07 $\mu m^2$ to 490.87 $\mu m^2$, inclusive. For example, the support area may be 7.07 $\mu m^2$, 78.54 $\mu m^2$, 153.94 $\mu m^2$, 314.16 $\mu m^2$ or 490.87 $\mu m^2$.

For example, as shown in FIGS. 2 and 3, the spacer 4 is the cylindrical shape, and the diameter D of the orthographic projection of the end of the spacer 4 proximate to the array substrate 1 on the base 101 is in a range of 7 µm to 15 µm, inclusive. For example, the diameter D may be 7 µm, 10 µm, 11 µm, 13 µm or 15 µm. That is, the support area of the spacer 4 is in a range of 38.48 µm² to 176.71 µm², inclusive. For example, the support area may be 38.48 µm², 78.54 µm², 95.03 µm², 132.73 µm² or 176.71 µm².

Further, as shown in FIGS. 2 and 3, the spacer 4 has the cylindrical shape, and the diameter D of the orthographic projection of the end of the spacer 4 proximate to the array substrate 1 on the base 101 is in a range of 9 µm to 13 µm, inclusive. For example, the diameter D may be 9 µm, 10 µm, 11 µm, 12 µm or 13 µm. That is, the support area of the spacer 4 is in a range of 63.62 µm² to 132.73 µm², inclusive. For example, the support area may be 63.62 µm², 78.20 µm², 98.18 µm², 118.25 µm² or 132.73 µm².

It will be noted that the spacer 4 may be has the cylindrical shape. However, limited by a patterning process used to form the spacer 4, the obtained spacer 4 usually has a shape of a circular truncated cone. That is, the diameter of the orthographic projection of the end of the spacer 4 proximate to the array substrate 1 on the base 101 is greater than a diameter of an orthographic projection of the end of the spacer 4 away from the array substrate 1 on the base 101. That is, the area of the orthographic projection of the end of the spacer 4 proximate to the array substrate 1 on the base 101 is greater than an area of the orthographic projection of the end of the spacer 4 away from the array substrate 1 on the base 101.

Figure 8:
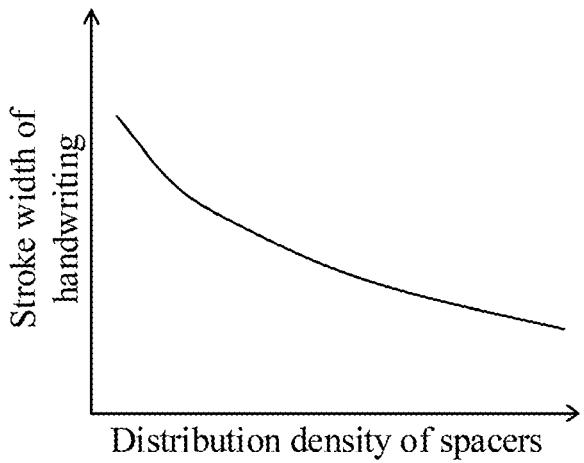
FIG. 8 is a curve chart showing a relationship between a stroke width of handwriting on a writing panel and a distribution density of spacers, in accordance with some embodiments.

In some embodiments, in a case where different distribution densities of the spacers 4 are simulated, the stroke width of the handwriting on the writing panel 100 is measured. FIG. 8 is a curve chart showing a relationship between the stroke width of the handwriting and the distribution density of the spacers 4. As can be seen, as the distribution density of the spacers 4 increases, the stroke width of the handwriting decreases. This is because as the distribution density of the spacers 4 increases, the pressure sharing by the spacers 4 increases, and the pressure on the liquid crystal layer 3 decreases. That is, when the same magnitude of pressure acts on the writing panel 100, the proportion of the pressure on the liquid crystal layer 3 decreases. Therefore, the region of liquid crystal molecules with the texture change decreases, and the stroke width of the handwriting decreases. Similarly, as the distribution density of the spacers 4 decreases, the stroke width of the handwriting increases.

It will be noted that, as shown in FIGS. 2 and 3, "the distribution density of the spacers 4" refers to, in a plane parallel to the base 101, the number of spacers 4 provided in a region per square millimetre.

For example, as shown in FIG. 2, in the plane parallel to the base 101, the number of the spacers 4 provided in the region per square millimetre is in a range of 10 to 1000. For example, the number may be 10, 100, 505, 800 or 1000.

For example, as shown in FIG. 2, in the plane parallel to the base 101, the number of the spacers 4 provided in the region per square millimetre is in a range of 20 to 200. For example, the number may be 20, 80, 110, 160 or 200.

Further, as shown in FIG. 2, in the plane parallel to the base 101, the number of the spacers 4 provided in the region per square millimeter is in a range of 50 to 100. For example, the number may be 50, 60, 75, 85, 90 or 100.

In some embodiments, the height C of the spacer 4 is 2.3 µm, the diameter D of the orthographic projection of the end of the spacer 4 proximate to the array substrate 1 on the base 101 is 13 µm, and the distribution density of the spacers 4 is 50 spacers 4 provided in the region per square millimeter. As a result, the stroke width of the handwriting may be controlled to be equal to or close to 3.8 mm.

In some embodiments, the height C of the spacer 4 is 1.9 µm, the diameter D of the orthographic projection of the end of the spacer 4 proximate to the array substrate 1 on the base 101 is 9 µm, and the distribution density of the spacers 4 is 100 spacers 4 provided in the region per square millimeter. As a result, the stroke width of the handwriting may be controlled to be equal to or close to 3.3 mm.

In some embodiments, the height C of the spacer 4 is 2.3 µm, the diameter D of the orthographic projection of the end of the spacer 4 proximate to the array substrate 1 on the base 101 is 9 µm, and the distribution density of the spacers 4 is 100 spacers 4 provided in the region per square millimeter. As a result, the stroke width of the handwriting may be controlled to be equal to or close to 3.6 mm.

It will be noted that, limited by the process of forming the spacer 4, the stroke width of the handwriting has a deviation of plus or minus (±) 0.5 mm, and there may be a larger deviation. For example, the stroke width of the handwriting has a deviation of ±1.0 mm.

Figure 9:
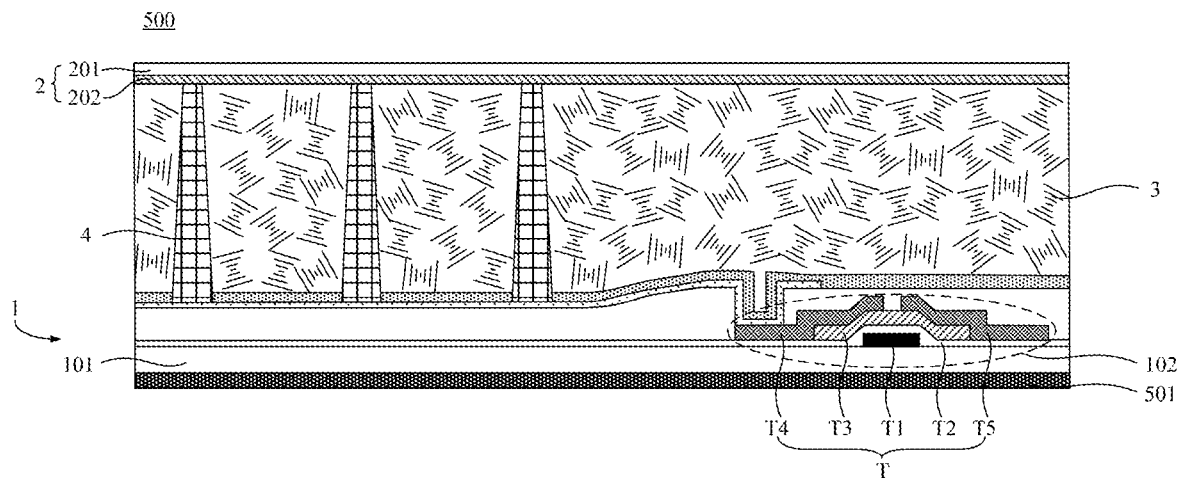
FIG. 9 is a partial sectional view of a writing board with reference to the line O-O' in FIG. 2, in accordance with some embodiments.

Some embodiments of the present disclosure provide a writing board. As shown in FIG. 9, the writing board 500 includes the writing panel 100 in any embodiment described above, and a base layer 501 provided on a side of the array substrate 1 away from the flexible substrate 2. The base layer 501 is configured to block light from entering the writing panel 100 from the side of the array substrate 1 away from the flexible substrate 2. When no writing is performed, the liquid crystal molecules in the liquid crystal layer 3 have no texture change and are in the state of weakly scattering the natural light, and the whole writing region 10 of the writing panel 100 displays a color of the base layer 501. When the writing is performed, a region of the liquid crystal layer 3 where liquid crystal molecules have the texture change selectively reflects the visible light to display the handwriting; and the remaining region of the liquid crystal layer 3 where liquid crystal molecules have no texture change weakly scatters the natural light, so that a portion of the writing region 10 corresponding to the region of the liquid crystal layer 3 where the liquid crystal molecules have no texture change displays the color of the base layer 501.

For example, the color of the base layer 501 is dark, such as black, so that the region of the writing panel 100 corresponding to the region of the liquid crystal layer 3 where the liquid crystal molecules have no texture change displays black, which may improve contrast of an image of the handwriting on the writing panel 100.

In the writing board 500 of some embodiments of the present disclosure, the spacers 4 each have the cylindrical shape, the orthographic projection of each spacer 4 on the base 101 is non-overlapping with the orthographic projections of the plurality of thin film transistors T and the plurality of signal lines L on the base 101. It is conducive to control precision of sizes of the spacers 4 and the distribution density of the spacers 4 in the writing panel 100, so as to improve the uniformity of the cell thickness of the writing panel 100 and the uniformity of the distribution of the spacers 4 in the writing panel 100. As a result, the uniformity of the handwriting on the writing board 500 may be improved.

Figure 10A:
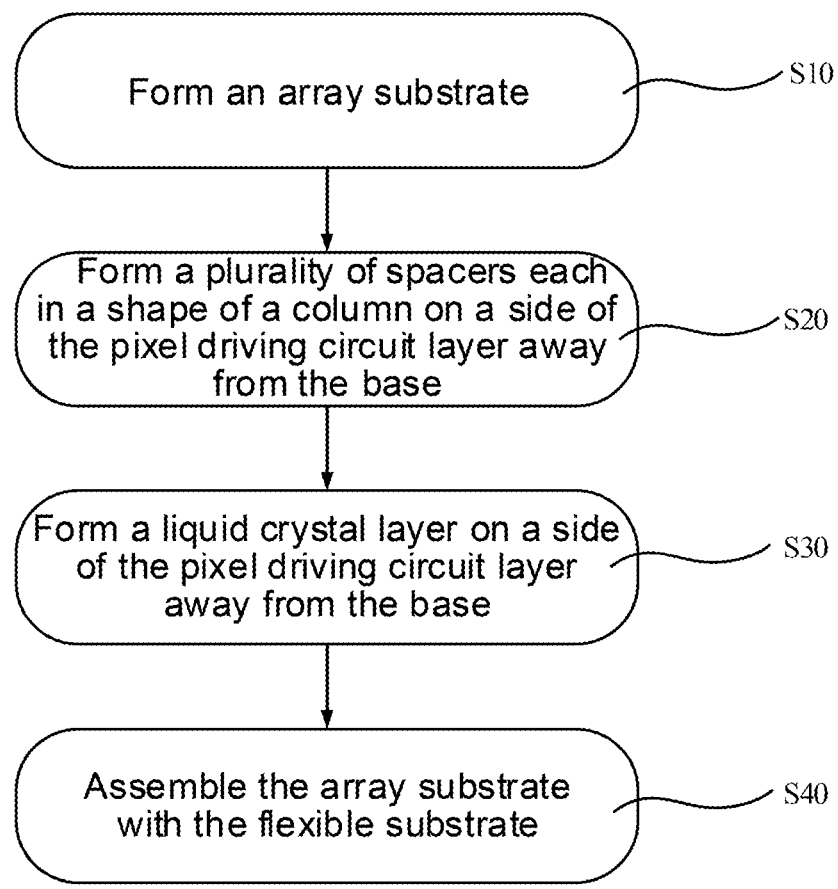
FIG. 10A is a flowchart of a manufacturing method for a writing panel, in accordance with some embodiments.

Embodiments of the present disclosure further provide a manufacturing method for a writing panel. As shown in FIG. 10A, the manufacturing method includes step S1 to step S40 below.

In step S10, the array substrate 1 is formed. The array substrate 1 includes a base 101 and a pixel driving circuit layer 102 disposed on the base 101. The pixel driving circuit layer 102 includes a plurality of thin film transistors T and a plurality of signal lines L.

Figure 11:
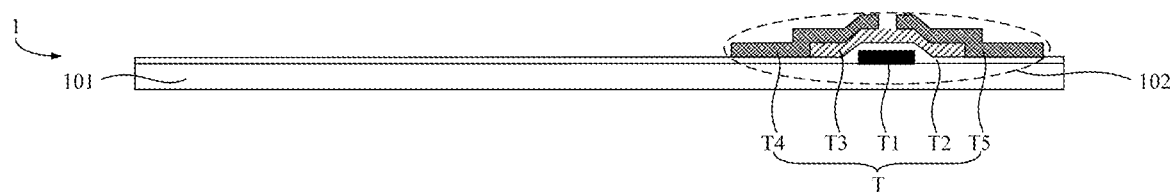
FIGS. 11 to 19 are diagrams showing steps of a manufacturing method for a writing panel, in accordance with some embodiments.

For example, as shown in FIG. 11, a gate T1, a portion of a gate insulating layer T2, an active layer T3, a source T4 and a drain T5 of the thin film transistor T are sequentially formed on the base 101. The plurality of signal lines L include a plurality of gate lines GL and a plurality of data lines DL. A gate line GL and the gate T1 are electrically connected and disposed in a same layer (the gate line GL is shaded by the gate T1 in FIG. 11). A data line DL and one of the source T4 and the drain T5 are electrically connected and disposed in a same layer (the data line DL is shaded by the source T4 or the drain T5 in FIG. 11).

Figure 10B:
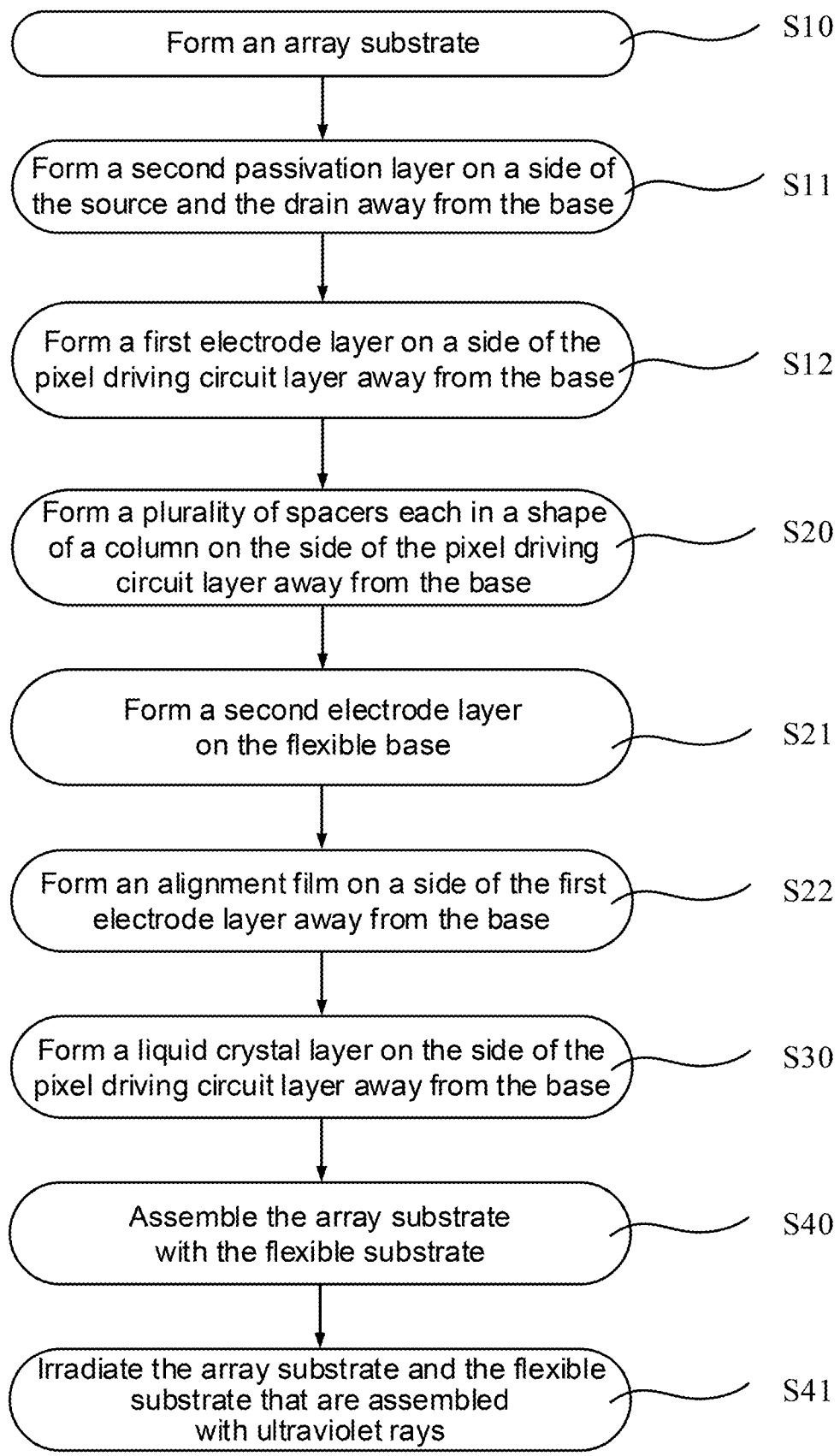
FIG. 10B is a flowchart of another manufacturing method for a writing panel, in accordance with some embodiments.

In some embodiments, as shown in FIG. 10B, after the step S10, forming the array substrate includes the following step.

Figure 12:
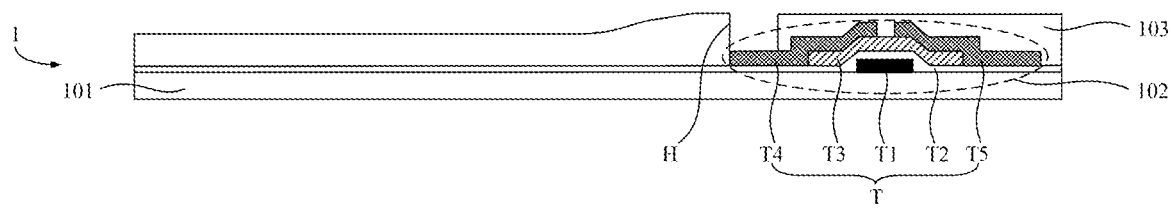

In step S11, as shown in FIG. 12, a second passivation layer 103 is formed on a side of the source T4 and the drain T5 away from the base 101. A plurality of via holes H are formed in the second passivation layer 103, and a via hole H is used to expose at least a portion of the source T4 or the drain T5 (FIG. 12 shows a case where the via hole H exposes a portion of the source T4).

In some embodiments, as shown in FIG. 10B, before step S20 (which is described below), forming the array substrate further includes the following step.

Figure 13:
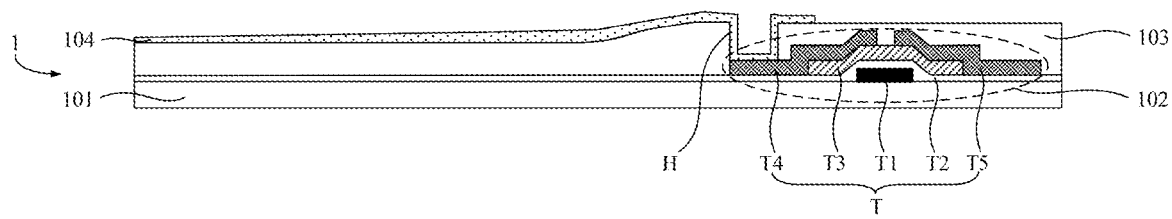

In step S12, as shown in FIG. 13, a first electrode layer 104 is formed on a side of the pixel driving circuit layer 102 away from the base 101. The first electrode layer 104 is electrically connected to one of the source T4 and the drain T5, which is not electrically connected to the data line DL, through the via hole in the second passivation layer 103 (FIG. 13 shows a case where the first electrode layer 104 is electrically connected to the source T4, that is, the drain T5 is electrically connected to the data line DL).

In step S20, a plurality of spacers 4 each in a shape of a column are formed on the side of the pixel driving circuit layer 102 away from the base 101. Orthographic projections of the plurality of spacers 4 on the base 101 are non-overlapping with orthographic projections of the plurality of thin film transistors T and the plurality of signal lines L on the base 101.

Figure 14:
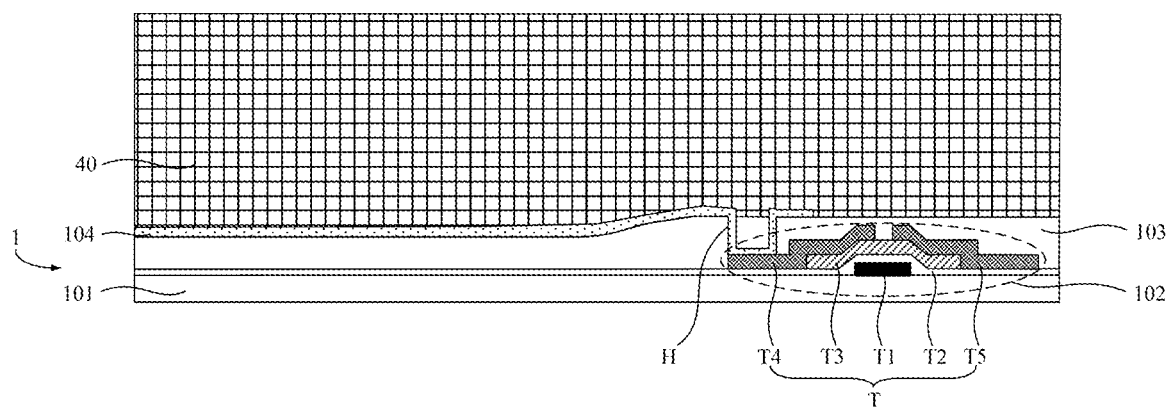
Figure 15:
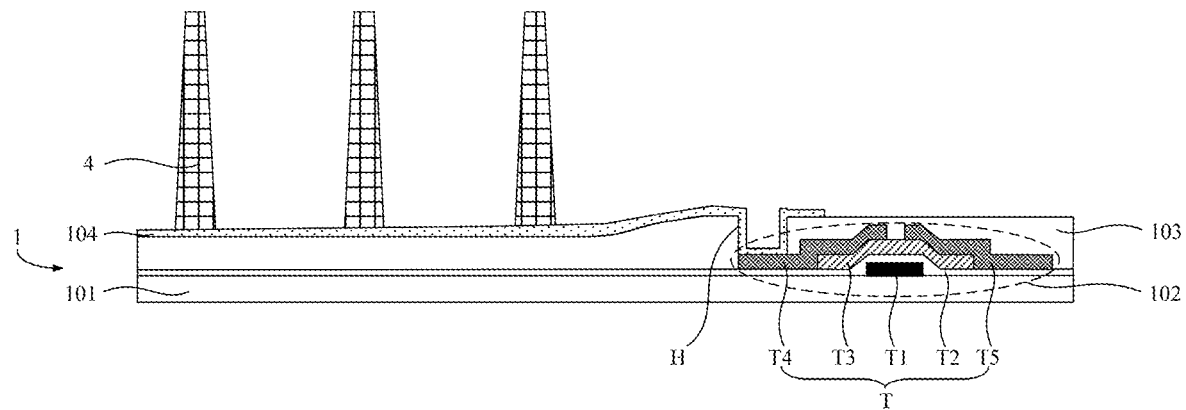

For example, the plurality of spacers 4 each in the shape of the column are formed on the side of the pixel driving circuit layer 102 away from the base 101 through a patterning process. For example, as shown in FIG. 14, a spacer layer 40 is formed on the side of the pixel driving circuit layer 102 away from the base 101; and as shown in FIG. 15, the spacer layer 40 is patterned through the patterning process to form the plurality of spacers 4.

In the above steps, patterning the spacer layer 40 through the patterning process to form the plurality of spacers 4 may include the following steps.

A photoresist layer is formed on a side of the spacer layer 40 away from the base 101 through a photolithography process, and a pattern of the photoresist layer may be substantially the same as the pattern of the overall arrangement of the spacers 4 shown in FIG. 2. The spacer layer 40 is etched through the photoresist layer as a mask to form the plurality of spacers 4.

For example, a material of the spacer layer 40 may include resin.

In some embodiments, as shown in FIG. 10B, after step S20, the manufacturing method for the writing panel further includes the following steps.

Figure 16:
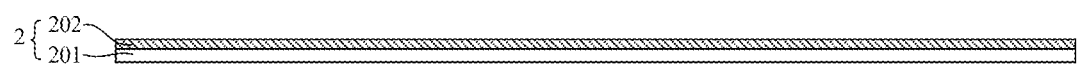

In step S21, as shown in FIG. 16, a second electrode layer 202 is formed on a flexible base 201 to obtain the flexible substrate 2.

Figure 17:
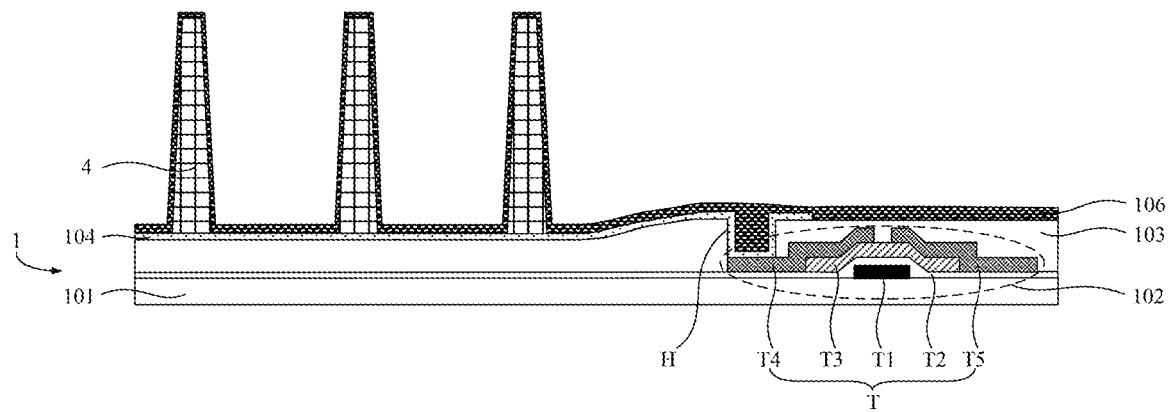

In step S22, as shown in FIG. 17, an alignment film 106 is formed on a side of the first electrode layer 104 away from the base 101, and the alignment film 106 is in direct contact with the first electrode layer 104.

For example, the step of forming the alignment film 106 includes coating the side of the first electrode layer 104 away from the base 101 with an alignment film liquid containing polyimide (PI), and the alignment film 106 being formed after the alignment film liquid is cured.

In step S30, a liquid crystal layer 3 is formed on the side of the pixel driving circuit layer 102 away from the base 101.

Figure 18:
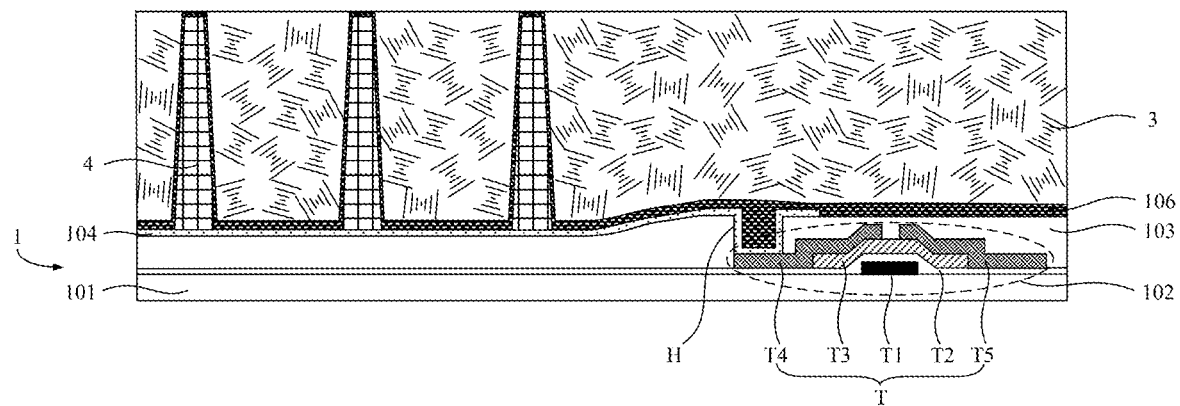

For example, as shown in FIG. 18, the array substrate 1 is coated with a sealing adhesive, and liquid crystals containing polymerizable monomers are dripped in a box enclosed by the sealing adhesive to form the liquid crystal layer 3.

It will be noted that, FIG. 18 is a partial sectional view showing a step of forming the liquid crystal layer 3, and the sealing adhesive is not shown.

Figure 19:
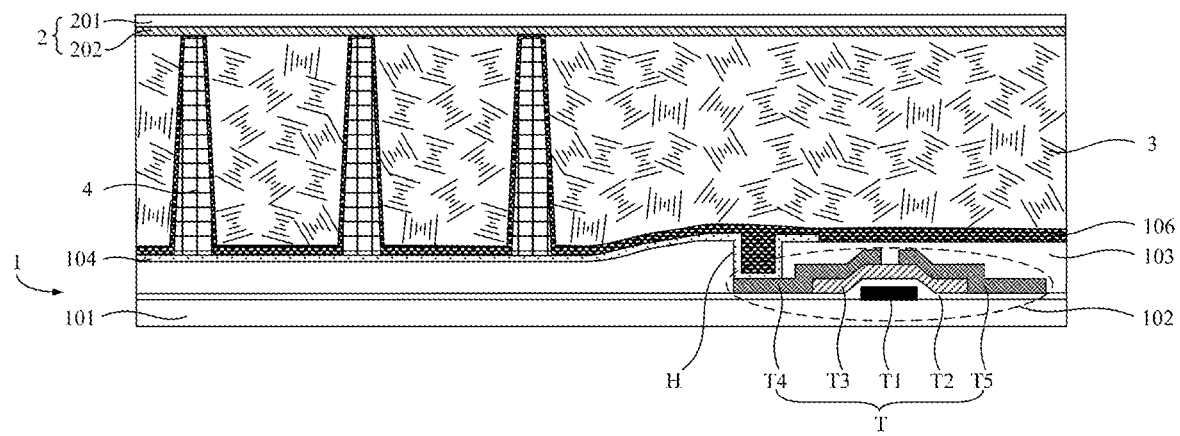

In step S40, as shown in FIG. 19, the array substrate 1 and the flexible substrate 2 are assembled.

For example, the array substrate 1 and the flexible substrate 2 may be assembled by rolling.

In some embodiments, after step S40, the manufacturing method for the writing panel further includes the following step.

In step S41, the array substrate 1 and the flexible substrate 2 that are assembled are irradiated with ultraviolet rays (UV), so that the sealing adhesive is cured, and the polymerizable monomers in the liquid crystal layer 3 are reacted to form a polymer network. In this way, the writing panel 100 is obtained.

In the above manufacturing method of some embodiments of the present disclosure, the alignment film 106 is formed on the side of the first electrode layer 104 away from the base 101. The alignment film 106 provides the liquid crystal molecules in the liquid crystal layer 3 with a pretilt angle, which may reduce a magnitude of the erasing voltage or increase a response speed of erasing the handwriting. In addition, the alignment film 106 protects the first electrode layer 104. The alignment film 106 insulates the first electrode layer 104 from the second electrode layer 202, so as to avoid a short circuit caused by electrical connection between the first electrode layer 104 and the second electrode layer 202 due to deformation of the writing panel 100 under pressure.

Embodiments of the present disclosure further provide a manufacturing method for another writing panel, which does not include S22 compared with the manufacturing method for the writing panel including S10 to S40. Before step S20, the manufacturing method for the another writing panel further includes the following steps.

Figure 20:
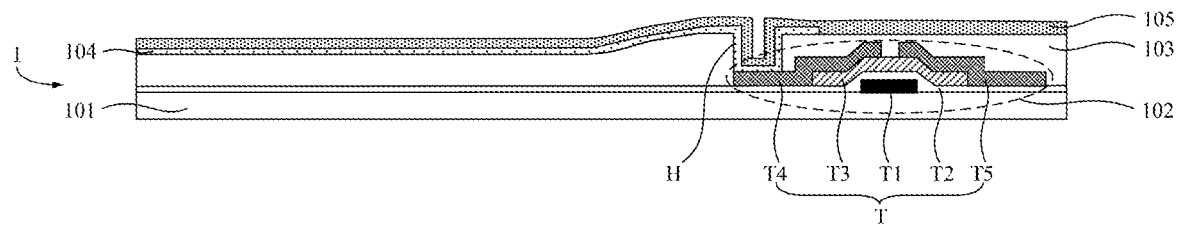
FIG. 20 is a diagram of some structures of another writing panel, in accordance with some embodiments.

As shown in FIG. 20, a passivation layer 105 is formed on the side of the first electrode layer 104 away from the base 101.

In the above manufacturing method of some embodiments of the present disclosure, the first passivation layer 105 protects the first electrode layer 104, and insulates the first electrode layer 104 from the second electrode layer 202, so as to prevent the short circuit caused by the electrical connection between the first electrode layer 104 and the second electrode layer 202 due to the deformation of the writing panel 100 under the pressure.

Embodiments of the present disclosure further provide a manufacturing method for yet another writing panel, which further includes the following step before S20 compared with the manufacturing method for the writing panel including S10 to S40.

Figure 21:
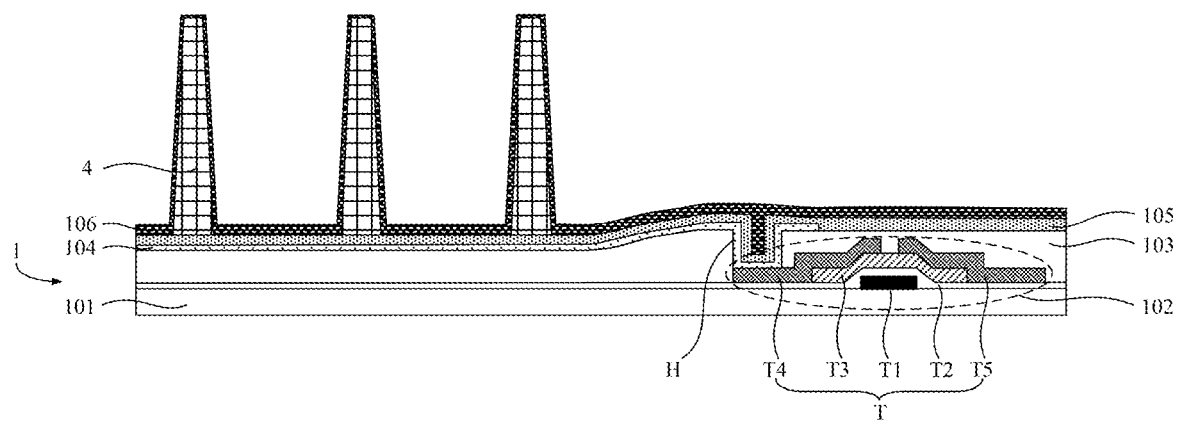
FIG. 21 is a diagram of some structures of yet another writing panel, in accordance with some embodiments.

As shown in FIG. 21, a first passivation layer 105 is formed on the side of the first electrode layer 104 away from the base 101.

In the above manufacturing method of some embodiments of the present disclosure, the first passivation layer 105 and the alignment film 106 are sequentially formed on the side of the first electrode layer 104 away from the base 101. The first passivation layer 105 and the alignment film 106 may protect the first electrode layer 104, and insulate the first electrode layer 104 from the second electrode layer 202.

The foregoing descriptions are merely specific implementations of the present disclosure, but the protection scope of the present disclosure is not limited thereto. Any changes or replacements that a person skilled in the art could readily conceive of within the technical scope of the present disclosure shall be included in the protection scope of the present disclosure. Therefore, the protection scope of the present disclosure shall be subject to the protection scope of the claims.

What is claimed is:

1. A writing panel, comprising:
    an array substrate, the array substrate including a base and a pixel driving circuit layer disposed on the base, the pixel driving circuit layer including a plurality of thin film transistors and a plurality of signal lines;
    a flexible substrate disposed opposite to the array substrate;
    a liquid crystal layer disposed between the array substrate and the flexible substrate; and
    a plurality of spacers each in a shape of a column disposed on a surface of the array substrate proximate to the liquid crystal layer, an orthographic projection of each spacer on the base being non-overlapping with orthographic projections of the plurality of thin film transistors and the plurality of signal lines on the base,
    wherein the writing panel has a plurality of pixel regions;
    each pixel region is provided with some of the plurality of spacers therein, and the some of the plurality of spacers are arranged in an array; and
    a row direction of the array in which the some of the plurality of spacers are arranged is a first direction, and a column direction of the array in which the some of the plurality of spacers are arranged is a second direction;
    in a pixel region of the pixel regions, a distance between two spacers adjacent to each other in the first direction is approximately equal to a distance between two spacers adjacent to each other in the second direction; and
    a distance between two nearest spacers that are respectively located in two pixel regions adjacent to each other in the first direction is approximately equal to a distance between two nearest spacers that are respectively located in two pixel regions adjacent to each other in the second direction.

2. The writing panel according to claim 1, wherein a distance between two spacers adjacent to each other in the first direction is approximately equal to a distance between two spacers adjacent to each other in the second direction.

3. The writing panel according to claim 1, wherein the array substrate further includes an alignment film disposed on a side of the pixel driving circuit layer proximate to the liquid crystal layer; and
    the alignment film is configured to provide liquid crystal molecules in the liquid crystal layer with a pretilt angle.

4. The writing panel according to claim 1, wherein the array substrate further includes a first electrode layer disposed on a side of the pixel driving circuit layer proximate to the liquid crystal layer; and
    the flexible substrate includes a flexible base and a second electrode layer disposed on a side of the flexible base proximate to the liquid crystal layer.

5. The writing panel according to claim 4, wherein the array substrate further includes an alignment film configured to provide liquid crystal molecules in the liquid crystal layer with a pretilt angle, and the alignment film is disposed on a side of the first electrode layer proximate to the liquid crystal layer.

6. The writing panel according to claim 5, wherein the alignment film is in direct contact with the first electrode layer.

7. The writing panel according to claim 4, wherein the array substrate further includes a first passivation layer disposed on a side of the first electrode layer proximate to the liquid crystal layer.

8. The writing panel according to claim 7, wherein the array substrate further includes an alignment film configured to provide liquid crystal molecules in the liquid crystal layer with a pretilt angle, and the alignment film is disposed on a side of the first passivation layer proximate to the liquid crystal layer.

9. The writing panel according to claim 1, wherein in a direction perpendicular to the base, a height of the spacers is in a range of 1.0 μm to 10 μm, inclusive.

10. The writing panel according to claim 1, wherein the spacers each have a shape of a circular column, and a diameter of an orthographic projection of one end of the spacer proximate to the array substrate on the base is in a range of 3 μm to 25 μm, inclusive.

11. The writing panel according to claim 1, wherein in a plane parallel to the base, a number of spacers provided in a region per square millimeter is in a range of 10 to 1000, inclusive.

12. The writing panel according to claim 1, wherein ends of the spacers proximate to the base are fixed to the surface of the array substrate; and/or
    a material of the liquid crystal layer includes cholesteric liquid crystals.

13. A writing board, comprising:
    the writing panel according to claim 1; and
    a base layer disposed on a side of the array substrate away from the flexible substrate, the base layer being configured to block light from entering the writing panel from the side of the array substrate away from the flexible substrate.

14. A manufacturing method for a writing panel, comprising:
    forming an array substrate, the array substrate including a base and a pixel driving circuit layer disposed on the base, the pixel driving circuit layer including a plurality of thin film transistors and a plurality of signal lines;
    forming a plurality of spacers each in a shape of a column on a side of the pixel driving circuit layer away from the base, wherein an orthographic projection of each spacer on the base is non-overlapping with orthographic projections of the plurality of thin film transistors and the plurality of signal lines on the base;

the writing panel has a plurality of pixel regions;

each pixel region is provided with some of the plurality of spacers therein, and the some of the plurality of spacers are arranged in an array;

a row direction of the array in which the some of the plurality of spacers are arranged is a first direction, and a column direction of the array in which the some of the plurality of spacers are arranged is a second direction;

in a pixel region of the pixel regions, a distance between two spacers adjacent to each other in the first direction is approximately equal to a distance between two spacers adjacent to each other in the second direction; and a distance between two nearest spacers that are respectively located in two pixel regions adjacent to each other in the first direction is approximately equal to a distance between two nearest spacers that are respectively located in two pixel regions adjacent to each other in the second direction;

forming a liquid crystal layer on the side of the pixel driving circuit layer away from the base; and assembling the array substrate with a flexible substrate.

15. The manufacturing method according to claim 14, wherein forming the array substrate includes:

forming a first electrode layer on the side of the pixel driving circuit layer away from the base before the plurality of spacers each in the shape of the column are formed on the side of the pixel driving circuit layer away from the base.

16. The manufacturing method according to claim 15, wherein forming the array substrate further includes:

forming an alignment film on a side of the first electrode layer away from the base after the plurality of spacers each in the shape of the column are formed on the side of the pixel driving circuit layer away from the base, wherein the alignment film is in direct contact with the first electrode layer, and the alignment film is configured to provide liquid crystal molecules in the liquid crystal layer with a pretilt angle.

17. The manufacturing method according to claim 15, wherein forming the array substrate further includes:

forming a first passivation layer on a side of the first electrode layer away from the base before the plurality of spacers each in the shape of the column are formed on the side of the pixel driving circuit layer away from the base.

18. The manufacturing method according to claim 15, wherein forming the array substrate further includes:

forming a first passivation layer on a side of the first electrode layer away from the base before the plurality of spacers each in the shape of the column are formed on the side of the pixel driving circuit layer away from the base; and forming an alignment film on a side of the first passivation layer away from the base after the plurality of spacers each in the shape of the column are formed on the side of the pixel driving circuit layer away from the base, the alignment film being configured to provide liquid crystal molecules in the liquid crystal layer with a pretilt angle.

* * * * *